Figure 1:
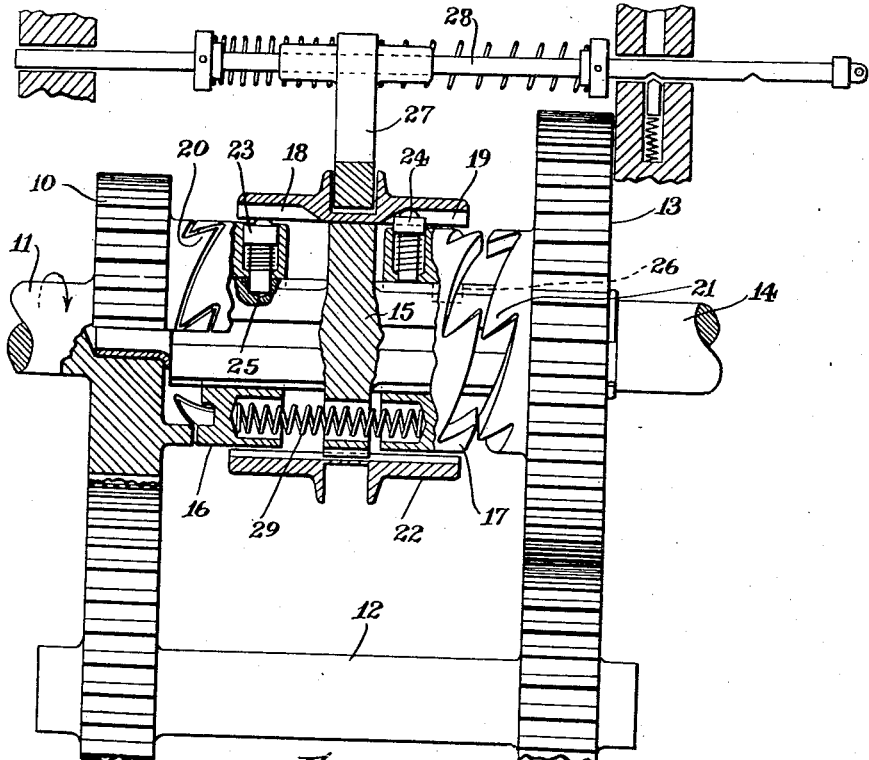

June 10, 1941.  H. SINCLAIR  2,245,017
VARIABLE-SPEED POWER-TRANSMISSION GEARING
Filed Oct. 20, 1937  4 Sheets-Sheet 1

June 10, 1941.    H. SINCLAIR    2,245,017
VARIABLE-SPEED POWER-TRANSMISSION GEARING
Filed Oct. 20, 1937    4 Sheets-Sheet 2

June 10, 1941.　　　H. SINCLAIR　　　2,245,017
VARIABLE-SPEED POWER-TRANSMISSION GEARING
Filed Oct. 20, 1937　　　4 Sheets-Sheet 3
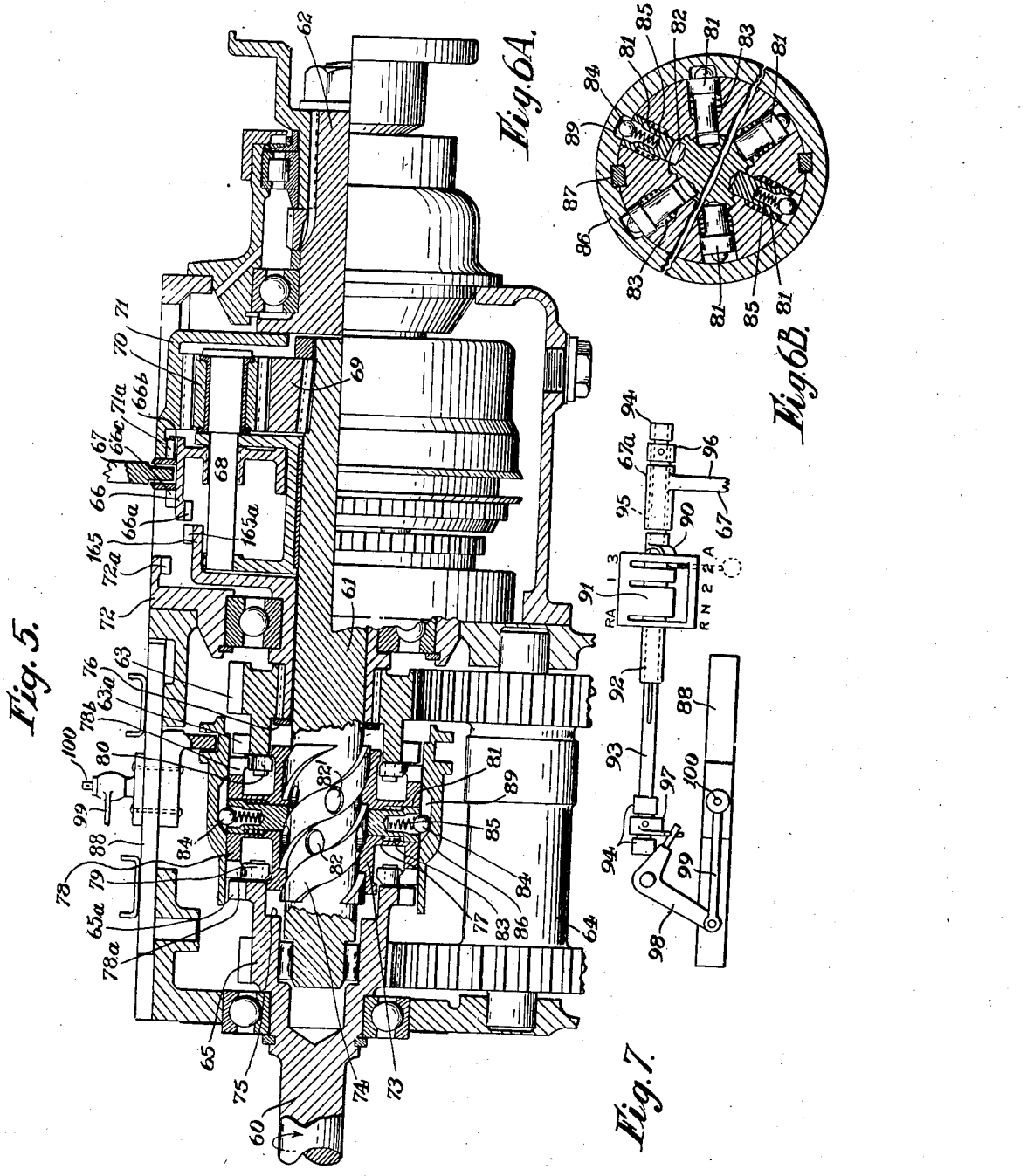

June 10, 1941.   H. SINCLAIR   2,245,017
VARIABLE-SPEED POWER-TRANSMISSION GEARING
Filed Oct. 20, 1937   4 Sheets-Sheet 4

Patented June 10, 1941

2,245,017

UNITED STATES PATENT OFFICE 2,245,017

VARIABLE-SPEED POWER-TRANSMISSION GEARING

Harold Sinclair, Kensington, London, England

Application October 20, 1937, Serial No. 169,973
In Great Britain November 4, 1936

20 Claims. (Cl. 74—337)

The present invention relates to variable-speed power-transmission gearing of the kind in which gear-changes can be effected while the gearing is running without necessarily interrupting, outside the gearing, the power-transmission system between the driving engine and the driven element of the system, the gear change being initiated by momentarily reducing the torque produced by the driving engine on the driving shaft of the gearing.

Such gearing has been used on motor-cars, either as a two-speed unit in series with a conventional change-speed and reverse gearing for the purpose of providing an "overdrive" (extra high speed) ratio which can be engaged and disengaged during running without requiring the operation of the main clutch pedal, or in the form of a unit yielding three or more forward speeds, which takes the place of the conventional multi-forward-ratio change-speed gearing and which is associated with a gear yielding neutral and reverse and with a slipable clutch used in starting the vehicle.

Such gear units on motor-cars have been provided with gear-selecting clutches of the sliding jaw type which are capable of transmitting both driving and over-running torque through the engaged jaws; and to enable the gear to be changed without disengaging the main friction clutch in series therewith it is necessary to provide powerful selecting mechanism, such as a servo-motor or control lever acting through a strong spring, capable of jerking the sliding jaw clutch member completely out of engagement during the very short period when the torque load on the gearing is negligible, as the torque passes from the driving to the over-running condition. If the jaw clutch were not completely disengaged when substantial over-running torque occurred on the gearing, this torque would lock the clutch in engagement and so prevent gear-changing.

Furthermore, while such a sliding jaw clutch is disengaged, the two elements thereof may attain a high relative speed, which could result in severe shock when the clutch was re-engaged. It is therefore necessary in such known arrangements to provide a control system which will ensure that the clutch is jerked into full engagement in the short period during which its driving and driven parts are in synchronism.

An object of the present invention is to provide improved change-speed gearing of the kind hereinbefore specified, in which the problem of gear-changing is simplified.

According to the present invention in one aspect, in the improved change-speed gearing, the clutch device for establishing the higher-speed drive (in a two-speed unit) or one of the higher-speed drives (in a unit yielding more than two forward speeds) comprises a unidirectional coupling which is so set that it invariably engages when its elements are urged to rotate relatively to each other by over-running torque, said unidirectional coupling being associated with controllable locking means which, during the establishing of said higher-speed drive, are incapable of being engaged before said unidirectional coupling is engaged and which, when engaged, render the clutch device capable of transmitting driving torque.

The terms "driving torque" and "over-running torque" are to be read, where the context allows, as including the reaction torques that occur, under driving and over-running conditions respectively, in a planetary gear system in which the clutch device for establishing a higher-speed drive is employed to transmit such reaction torques.

The improved gearing is preferably so arranged that, during operation of the gear-selecting clutches, that are employed for gear changing without interrupting the power-transmission system outside the gearing (e. g. by disengaging a main friction clutch disposed between a driving engine and the gearing), the ratio of the speeds of the driving and driven shafts of the gearing is unable to go outside the limits imposed by the highest- and lowest-speed gears yielded by such gear changing, that is to say, the ratio of the speed of the driving shaft to that of the driven shaft can never be higher than the ratio determined by said lowest-speed gear, and can never be lower than the ratio determined by said highest-speed gear.

Thus, according to this invention in a further aspect, the improved gearing comprises a driving shaft, a driven shaft, and two power-transmission paths of different ratios respectively, which are adapted alternatively to connect said shafts together, wherein the lower-speed-ratio path includes or has the form of a coupling which, when the ratio of the speeds of said driving and driven shafts tends to exceed said lower-speed ratio, invariably engages automatically under the influence of driving torque, and the higher-speed ratio path includes or has the form of a coupling which, when the ratio of the speeds of said driving and driven shafts tends to be lower than said higher-speed ratio, invariably engages automatically under the influence of over-running torque, said two couplings being adapted to disengage automatically on reversal of torque there-through, and said higher-speed coupling being associated with locking means which, during the establishing of the drive through said higher-speed path, are incapable of being engaged to lock this coupling before it is engaged and which are adapted automatically or at will to lock this coupling so as to render it capable of transmitting driving torque, and a control member operable for actuating said locking means.

Preferably the said locking means, or additional locking means, are associated with the lower-speed coupling, are incapable of being engaged, during the establishing of the drive through said lower-speed path, to lock this coupling before it is engaged, and are adapted automatically or at will to lock this coupling so as to render it capable of transmitting over-running torque, control means being provided for actuating these locking means.

Any of the alternative speed paths in the improved gearing may include an additional variable speed gearing of any desired kind, for example, a subsidiary unit itself made in accordance with this invention, or a hydraulic torque-converter, or even a gear providing only an emergency ratio and requiring the operation of a main clutch for its engagement.

The invention will be more fully described with reference to the accompanying drawings, in which—

Figure 8:
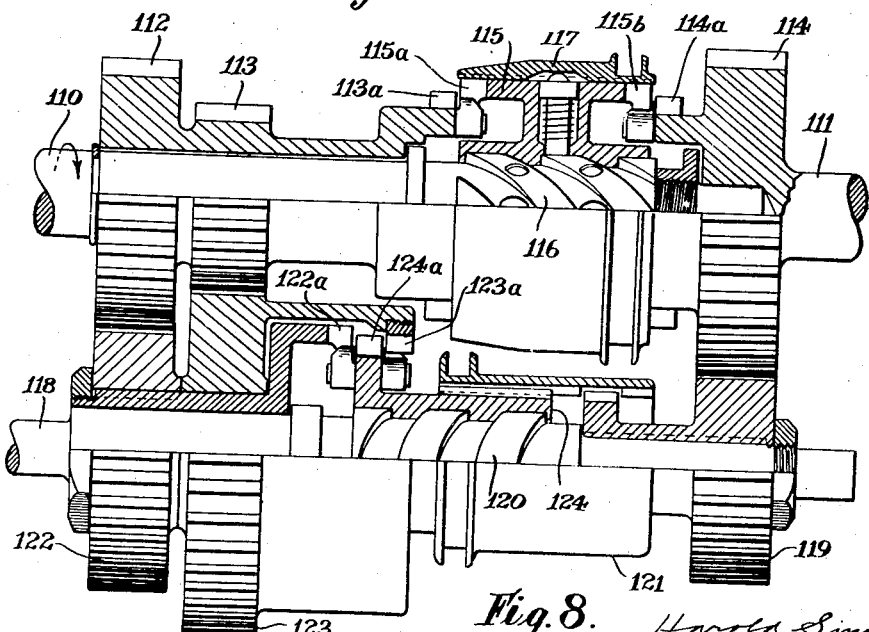
Figure 3:
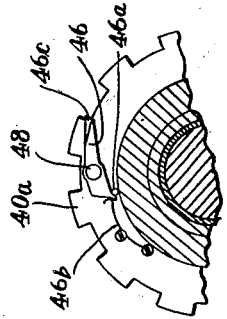
Figure 4:
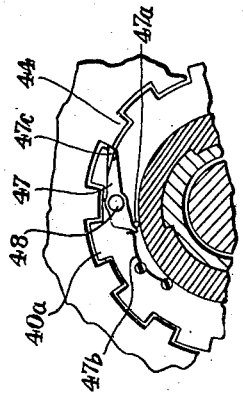
Figure 2:
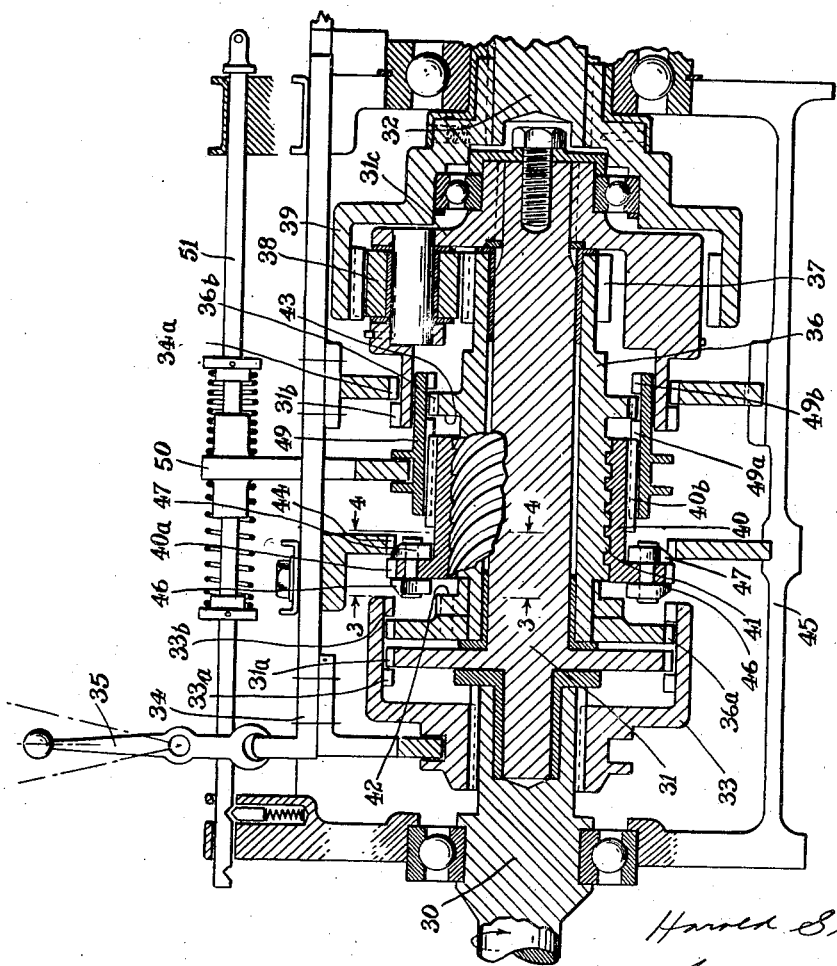
Figure 9:
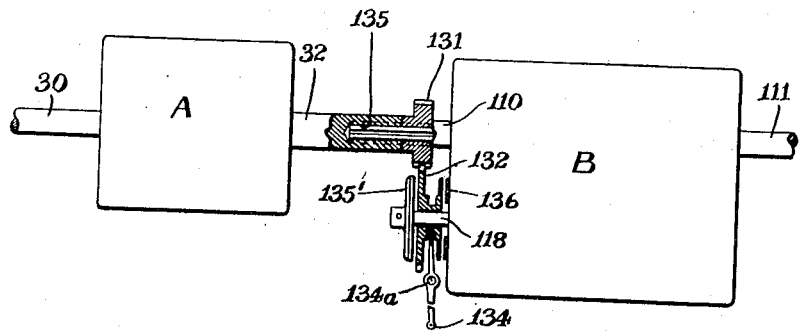
Figure 10:
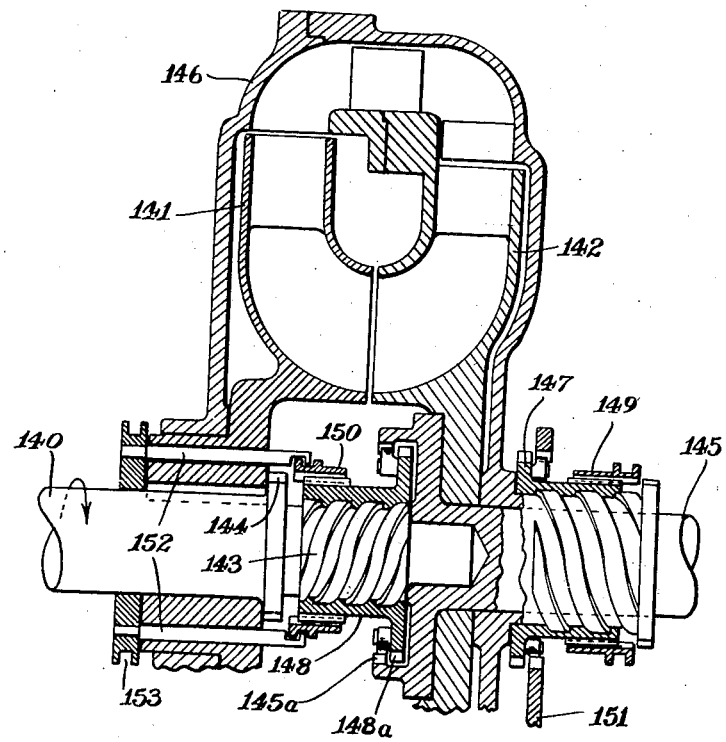

Fig. 1 is an explanatory diagram of a two-speed countershaft gear in accordance with the invention, Fig. 2 is a sectional elevation of an alternative arrangement embodying a planetary gear, Figs. 3 and 4 are sections of details on the lines 3—3 and 4—4 respectively in Fig. 2, Fig. 5 is a sectional elevation of a compounded planetary and countershaft gear, Figs. 6A and 6B are sectional end elevations of parts of a clutch device shown in Fig. 5, in different configurations respectively, Fig. 7 is a diagrammatic plan of control mechanism of the gear shown in Fig. 5, Fig. 8 is a diagrammatic section of a three-speed countershaft gear, Fig. 9 shows an arrangement for facilitating gear changing where two of the improved gear units are coupled in series, and Fig. 10 shows an embodiment of the invention in which one of the alternative paths in the gearing comprises a hydraulic torque converter.

In Fig. 1 a pinion 10 fixed to the driving shaft 11 is in constant driving connection through a countershaft 12 with a gear wheel 13 journalled on the driven shaft 14. Two unidirectional coupling members 16 and 17 having undercut ratchet teeth are slidably fitted on the driven shaft on opposite sides respectively of a collar 15, being constrained to rotate with this shaft by splines. The members 16 and 17 co-operate with ratchet teeth 20 and 21 formed respectively on the wheels 10 and 13. A locking sleeve 22 which is slidable on the collar 15 and constrained to rotate therewith by splines, is provided with axially disposed cam grooves 18 and 19 which co-operate respectively with a plurality of spring-loaded bolts, such as 23 and 24, which are engageable in holes 25 and 26 in the shaft 14 only when the respective ratchet teeth are fully engaged. The sleeve 22 can be biased towards its end positions by a fork 27 coupled by springs to a slidable preselector control rod 28. A plurality of springs, such as 29, are disposed between the ratchet members 16 and 17, their length being such that they permit one ratchet member to be inoperative when the other is fully engaged with the teeth 20 or 21 respectively, but, when one ratchet member begins to disengage, cause the other one to engage. The driving shaft 11 is intended to be coupled to a driving engine by a suitable main clutch, for example a hydraulic coupling or a centrifugal friction clutch.

Fig. 1 shows the gear in direct drive, but with low-speed preselected in readiness to make the change.

When starting in low gear, the locking bolts 23 are in their unlocked positions, similar to the bolts 24 as drawn, and the control rod 28 is in the right-hand position shown. When driving torque is applied to the shaft 11, it rotates in the direction of the arrow thereon, and the drive passes through the gear wheel trains and the low-gear ratchet coupling member 17 to the driven shaft 14, the ratchet teeth 20 throwing the high-gear ratchet member 16 out of engagement with them as the low-gear ratchet member 17 is drawn into full engagement. The cam slots 19 of the spring-biased locking sleeve 22 now force the bolts 24 into the holes 26, locking the low-gear ratchet coupling so that over-running torque is transmitted if the engine is decelerated.

In order to change to high gear, the preselector control rod 28 is moved to its left-hand position, and the fork 27 moves the sleeve 22 to the left, allowing the bolts 24 to disengage from the holes 26 since these bolts are not loaded when driving torque is being transmitted in low gear. The cam slots 18 now urge the bolts 23 inwards, but since the high-gear ratchet member 16 is disengaged, the bolts 23 are not in register with the holes 25. The engine is now decelerated, causing the low-gear ratchet member 17 to over-run the ratchet teeth 21 owing to the inertia of the parts driven by the shaft 14. The springs 29 now urge the high-gear ratchet member 16 into contact with the teeth 20, but since the shaft 11 is running faster than the member 16, the latter is unable to move far enough to the left to bring the bolts 23 into register with the holes 25, the teeth 20 and the teeth on the member 16 being so set that they resist interengagement so long as the wheel 10 turns forward faster than the member 16. When the speed of the driving shaft 11 has fallen to that of the driven shaft 14, the high-gear inverted ratchet coupling 16, 20 engages fully and maintains the speeds of these two shafts in synchronism, that is, the speed of the engine is prevented from falling further, relatively to the speed of the driven shaft. Full engagement of the high-gear ratchet member 16 brings the bolts 23 into register with the holes 25, so that the spring-biased locking sleeve 22 can complete its movement to the left to engage these bolts in the holes 25. The engine is now accelerated, and the driving torque is transmitted from the shaft 11 through the high-gear ratchet coupling 20, 16, which is prevented by the locking bolts 23 from disengaging under the driving torque.

To change from high to low gear, the control rod 28 is moved to its right-hand position so that the cam grooves 19 urge the bolts 24 inwards. The bolts 23, owing to the driving torque load acting between the teeth 20 and the member 16 urging the latter towards the disengaged position, remain in the engaged condition as shown in Fig. 1. The engine is now momentarily decelerated, so that the driving torque vanishes and the driving and driven shafts are held in synchronism under over-running torque by the high-gear ratchet coupling 20, 16. The bolts 23, being now unloaded, spring outwards and unlock the high-gear coupling 20, 16, and as the engine accelerates, the ratchet teeth 20 over-run the ratchet member 16. The springs 29 thereupon bring the low-gear ratchet member 17 into contact with the teeth 21; but, since the shaft 14 is rotating faster than the wheel 13, the coupling member is at first unable to move far enough to the right to bring the bolts 24 into register with the holes 26. When the speed of the wheel 13 has been raised to that of the shaft 14, the low-gear ratchet coupling 17, 21 engages fully and establishes the low speed condition. Full engagement of the coupling member 17 brings the bolts 24 into register with the holes 26 so that the locking sleeve 22 can complete its movement to the right to engage these bolts.

Where the main clutch is, for example, a constantly filled hydraulic coupling, which is incapable of entirely disconnecting the drive through it, disengagement of the high gear, while the engine is idling and the driven shaft has been arrested by the load thereon, can be facilitated by providing means for imparting at will a reverse rotation to the driving shaft, as described in my Patent Specification No. 1,978,172.

Fig. 1 shows a simple arrangement with the object of explaining easily the principle of this invention. In practice, however, it is preferred to use a more robust form of unidirectional coupling. The further examples to be described embody a Legge positive unidirectional coupling having locking means for providing bidirectional drive.

Fig. 2 shows a planetary gear system providing two forward speeds, namely a direct drive and an overdrive, with preselectable synchronised changing between them, and also a reverse gear and a neutral condition. An intermediate planet-carrier shaft 31 is coaxial with a driving shaft 30 and a driven shaft 32. A slidable driving jaw-clutch member 33, controlled by a reversing lever 35 through a selector bar 34, is provided with teeth 33a and 33b adapted respectively to engage alternatively teeth 31a on the shaft 31 and teeth 36a secured to a sun-gear sleeve 36 journalled on the shaft 31. A sun wheel 37 formed on the sleeve 36 meshes with planets such as 38 which in turn mesh with an annulus gear 39 fixed to the driven shaft 32. The planet-carrier 31c is provided with teeth 31b which can be engaged by teeth 34a on a non-rotatable ring fixed to the selector 34.

Synchronised self-shifting between forward speeds is provided by a double Legge coupling which comprises a nut 40 engaged with right-handed long-pitch helical splines 41 on the sun sleeve 36. The nut 40 has a limited range of helical movement on the sleeve 36 between abutments 42 and 43. Teeth 40a on the nut 40 are engageable alternatively with the teeth 33b (when the member 33 is in its right-hand position) and with teeth 44 fixed to the gear casing 45. A plurality of pawls 46 co-operate with the teeth 33b. These pawls are pivoted on pins 48 fixed to the nut 40 and are urged outwards by springs 46b against stops 46a (Fig. 3), their noses projecting slightly in advance of the teeth 40a. A similar series of pawls 47 (Fig. 4), influenced by springs 47b and stops 47a, and pivoted also on the pins 48, co-operate with the fixed teeth 44. A locking sleeve 49 is provided with internal splines 49a engaged with external splines 40b on the nut 40 and is capable of being urged axially by preselector control mechanism 50, 51, similar to that shown in Fig. 1. Additional splines 49b in the sleeve 49 are spaced from, and angularly displaced with reference to the splines 49a. The gap between the splines 49a and 49b can accommodate teeth 36b on the abutment member 43 of the sun sleeve 36.

This mechanism operates as follows. Assuming that the parts are in the position shown, the driving shaft 30 is arrested, the lever 35 is moved to the left so as to engage the teeth 33a and 31a and to bring the teeth 33b in the path of the pawls 46. The control rod 51 is moved to the left to preselect direct drive. The locking sleeve 49 is unable to move to the left, since the teeth 36b abut the ends of the splines 49b. The driving shaft is now accelerated in the direction of the arrow and the planet-carrier is rotated by the shaft 31. Owing to resistance of the load on the driven shaft 32, the planets 38 cause the sun sleeve 36 to revolve faster than the driving shaft. The pawls 46 on the nut 40 thereupon engage the teeth 33b, limiting the speed of the nut to that of the driving shaft, and the nut is consequently moved to the left by the action of the helical splines 41, the pawls 46 guiding the teeth 40a precisely into mesh with the teeth 33b. When the nut has reached the abutment 42, the rotation of the locking sleeve 49, relative to the sun shaft 36, has brought the grooves of the splines 49b into register with the teeth 36b, so that this sleeve springs to the left and engages the splines 49b with the teeth 36b, locking the nut against helical movement. The gear in this condition can transmit both driving and over-running torques directly between the shafts 30 and 32, the planetary train being locked solid.

To change to over-drive high speed, the preselector rod 51 is moved to its right-hand position and the locking sleeve 49 returns to the position shown, being prevented from moving further to the right by the ends of the splines 49a abutting the teeth 36b. The engine driving the shaft 30 is now decelerated, and the continued rotation of the annulus 39, under the inertia of the parts driven by the shaft 32, causes the sun sleeve 36 to be retarded more than the driving shaft. The nut 40 is consequently caused to move helically to the right until the teeth 40a disengage from the teeth 33b, and the pawls 47 at first ratchet over the fixed teeth 44. The continued retardation of the driving shaft causes the sun sleeve to come to rest and to begin to rotate in the opposite direction. Thereupon the pawls 47 hold the nut 40 against rotation so that it is moved to the right under the action of the helical splines 41, the teeth 40a being guided by the pawls precisely into mesh with the fixed teeth 44. When the nut has reached the abutment 43, the unidirectional coupling device formed by the nut and the fixed member having the teeth 44 is fully engaged under the influence of the over-running torque reaction. As the nut reaches the abutment 43, the grooves of the splines 49a of the locking sleeve come in register with the teeth 36b on the sun sleeve, so that the locking sleeve springs to the right and engages the splines 49a with the teeth 36b, locking the nut against helical movement. The engine driving the shaft 30 is now accelerated, and the reaction of the driving torque on the helical splines 41 tends to move the nut 40 to the left and to disengage the teeth 40a and 44. However, since the locking sleeve 49 now prevents helical movement of the nut, the gear remains locked in the over-drive condition, the sun wheel being stationary and the driven shaft 32 being rotated faster than the driving shaft.

To change from the over-drive speed to the lower direct speed the preselector control rod 51 is moved to the left. The locking sleeve 49 remains however in its right-hand position, being held by the load on its splines due to the driving torque reaction which it transmits. The driving engine is now momentarily retarded to unload the locking sleeve 49, which immediately springs to the position shown in Fig. 2. As the engine is again accelerated, the direct drive is established as hereinbefore described.

The pawls 46 and 47 have their noses bevelled at 46c and 47c (Figs. 3 and 4) to facilitate their depression by the teeth 33b and 44 during axial engagement.

To obtain reverse, the lever 35 is moved to the right, so that the selector 34 engages the teeth 33b with 36a and locks the planet cage against rotation by engaging the teeth 34a with 31b.

The gear shown in Fig. 5, which is suitable for use as the main change-speed gearing of a road motor vehicle, yields three forward speeds, neutral and reverse, the same double Legge synchro-coupling serving to yield preselectable self-shifting gear changes between first and second speeds and between second and third speeds.

A driving shaft 60 is co-axial with an intermediate shaft 61 and a driven shaft 62. A gear wheel 63 journalled on the shaft 61 is driven through a counter-shaft 64 from a gear wheel 65 fixed on the shaft 60, the speed ratio of the shaft 60 and the wheel 63 being 1.55 to 1. The intermediate wheel 63 is fixed to a jaw-clutch member 65a having teeth 165a engageable with teeth 66a on a jaw-clutch member 66 slidable by a fork 67 on planet-carrier pins such as 68. Planet pinions such as 70 mesh with a sun wheel 69 fixed to the shaft 61 and with an annulus gear 71 fixed to the driven shaft 62, the speed ratio of the cage and the sun when the annulus is fixed being 1 to 3. The slidable jaw-clutch member 66 is provided with additional teeth 66b and 66c engageable respectively with teeth 71a on the annulus and teeth 72a fixed to the gear casing 72.

The double synchro-coupling has a common nut 73 engaged with right-handed helical splines 74 of long pitch on the shaft 61. This nut has a limited range of helical movement between abutments 75 and 76. The nut is provided with an annular web 77 which merges into a tube 78 having at each end axially projecting teeth 78a and 78b, which are engageable alternatively with teeth 65a on the wheel 65 and with teeth 63a on the wheel 63. Pawls 79 are pivoted on the rear end of the driving shaft 60, and their noses point in an anti-clockwise direction, as viewed from the driving shaft end, and pawls 80 are pivoted on the wheel 63, their noses pointing in a clockwise direction as viewed from the driving shaft end. These two sets of pawls are arranged and operate similarly to the pawls 46 and 47 described with reference to Figs. 2, 3 and 4.

Locking means for this synchro-coupling include a plurality of bolts 81 slidable in radial holes in the part 77 of the nut. In the top half of Fig. 6 these bolts are shown in the unlocked condition, and in the bottom half in the locked condition. Their inner ends are engageable in two sets of holes, such as 82 and 82' (Fig. 5), registering with the bolts when the nut is in its two end positions respectively. The bolts 81 are urged outwards by light springs 83, and their outer ends are counterbored to receive balls 84 below which are strong springs 85 urging the balls half way out of the bolts. A selector sleeve 86, keyed at 87 (Fig. 6) to the tube 78, is slidable on this tube by a preselector bar 88. On the inner surface of the sleeve 86 are a series of longitudinal grooves 89 registering with the balls 84 and having a maximum depth equal to the radius of these balls. Both ends of the grooves are bevelled.

The control mechanism, shown diagrammatically in plan in Fig. 7 includes a gear change lever 90 working in a gate 91 and fixed to a sleeve 92 slidable on and keyed to a shaft 93 which is restrained against axial movement by fixed bearings 94. A hollow boss 67a of the jaw-clutch-actuating fork 67 is rotatably mounted on an extension 95 of the sleeve 92, and retained in place thereon by a collar 96. A fork-ended crank arm 97 fixed to the shaft 93 actuates a bell-crank lever 98 coupled by a link 99 to a pivot pin 100 in the preselector bar 88.

This gear operates as follows. It is assumed that the gear lever 90 is at position N; consequently none of the teeth on the jaw clutch member 66 is engaged, and the driving shaft 60 can rotate idly. A main friction clutch (not shown) connecting the shaft 60 to the engine is disengaged, and the lever 90 is moved to position 1, so that the teeth 66a are meshed with the teeth 165a, locking the planet-carrier to the gear wheel 63, and the selector sleeve 86 is moved to the right. The main clutch is now engaged to accelerate the driving shaft 60. The gear wheel 63 drives the planet-carrier at a reduced speed, and owing to the load resistance on the annulus 71 the sun wheel 69 tends to rotate faster than the driving shaft. The helical splines 74 consequently move the nut 73 to the left so as to engage the teeth 78a and 65a under the control of the pawls 79. The balls 84 are forced inwards by the bevelled left-hand ends of the grooves 89 and, when the bolts 81 register with the holes 82, the springs 85 cause them to enter these holes and lock the nut on the helical splines. Bidirectional drive in emergency low gear is thus established.

To change to second speed the lever 90 is moved to position 2 and thereafter urged towards position 2A. The initial movement to position 2 causes the selector sleeve 86 to move to the left and the springs 83 move the bolts 81 out of the holes 82. The driving shaft 60 is now retarded by decelerating the engine, while the driven shaft 62 continues to rotate owing to the inertia of the vehicle. As the planetary gear train constrains the shaft 61 to decelerate faster than the shaft 60, the helical splines 74 disengage the nut 73 from the driving shaft. As the jaw clutch member 165 is now unloaded, the lever 90 can move freely from position 2 to position 2A, engaging the teeth 66b and 71a, as soon as the pawls 80 pick up the teeth 78b, and there is consequently no relative rotation of the planetary gear elements. The planetary gear train now operates simply as a positive connection between the shafts 61 and 62. Meanwhile the teeth 78b have moved into full engagement with the teeth 63a and the bolts 81 have locked in the holes 82'. The speed reduction under these conditions is 1.55 to 1, namely that due to the counter-shaft gear.

To engage direct drive, the lever 90 is moved to position 3 so as to slide the selector sleeve to the right and unlock the bolts 81, and, when the engine is decelerated, the helical splines 74 cause the nut 73 to move to the left, the teeth 65a and 78a engaging under the control of the pawls 79 and maintaining the driving and driven shafts in synchronism under over-running torque. As soon as synchronism is established, the bolts 81 automatically lock in the holes 82 as hereinbefore described, ready to transmit the driving torque when the engine is accelerated.

To change from direct drive to second speed, the gear lever 90 may be moved to position 2A and the engine retarded, so that the elimination of driving torque unloads and thus permits disengagement of the locking bolts from the holes 82. The engine is now accelerated again to move the nut 73 to the right. The reaction due to the driving torque causes the teeth 78b and 63a to engage under the control of the pawls 80 and thereby synchronise the speeds of the driving and driven shafts in the second-speed ratio. The balls 84 are forced inwards by the bevelled right-hand ends of the grooves 89, and, when the bolts 81 register with the holes 82', the springs 85 cause them to enter these holes and lock the nut.

To change from second gear to first gear the lever 90 is urged towards position 2 and the engine is momentarily retarded. As the torque load reverses, the lever 90 moves to position 2, and its movement is continued through to position 1.

Reverse is given by moving the gear lever to position R, which engages the teeth 66c and 72a, so that the planet-carrier is locked against rotation. The planetary gear now acts as a reversing gear, the sun wheel 69 being driven through the countershaft gear trains. Position RA yields a higher speed reverse, in which the shafts 60 and 61 are directly coupled.

The gear shown diagrammatically in Fig. 8 has two double gear-selecting clutches and yields three forward speeds, the synchronised self-shifting change from any lower speed to the next higher speed being effected by operating only one or other of the two double clutches.

The driving shaft 110 can be connected alternatively to a gear wheel 114 fixed to the driven shaft 111, and to a pair of gear wheels 112, 113 journalled on the driving shaft, by a double synchro-coupling of the kind described with reference to Figs. 5 and 6. The coupling has a nut 115 engaged on right-handed helical splines 116 on the shaft 110 and a control sleeve 117. The wheel 114 meshes with a wheel 119 fixed to a countershaft 118. Gear wheels 122 and 123, meshing respectively with the wheels 112 and 113, are independently rotatable on the countershaft and can be connected alternatively thereto by a double synchro-coupling of the kind described with reference to Figs. 2 to 4. This coupling has a nut 124 engaged on left-handed helical splines 120 on the countershaft 118 and a locking sleeve 121.

The driving shaft 110 rotates in the direction of the arrow. On low gear the drive is transmitted through the parts 110, 116, 115, 115a, 113a, 113, 123, 123a, 124a, 124, 120, 118, 119, 114 and 111, the control sleeve 117 and the locking sleeve 121 being to the right.

To engage second gear, the locking sleeve 121 is biased to the left and the engine is retarded until the countershaft clutch nut 124 has attained and becomes locked in its left-hand position. The drive is now transmitted as on first gear as far as the teeth 113a, thence through the parts 112, 122, 122a, 124a, and thereafter as on first gear, the nut 124 being kept in its left-hand engaged position by the locking sleeve 121, which transmits part of the driving torque.

To engage direct drive, the control sleeve 117 is moved to the left and the engine is retarded until the driving-shaft clutch nut 115 has attained and become locked in its right-hand position. The drive is now transmitted through the parts 110, 116, 115, 115b, 114a, 114 and 111, the nut 115 being locked in its right-hand engaged position by the locking bolts therein, which transmit driving torque.

More than two speeds may be obtained by arranging in series a plurality of the improved change-speed gear units. Thus in Fig. 9 A and B denote two-speed and three-speed gears of the kind shown in Figs. 2 and 8 respectively, the driven shaft 32 of the unit A being directly connected by a splined coupling 135 to the driving shaft 110 of the unit B.

If the difference between high- and low-speed ratios in unit A is wider than the difference between third- and first-speed ratios in unit B, six different over-all ratios can be obtained in succession, and only when changing between third and fourth speeds has a simultaneous gear change to be made in both units. Over-all first speed is given by engaging first speed in B while low (direct) speed is engaged in A. Second and third speeds are obtained by changing B to second and third. Fourth speed is given by simultaneously changing A to high (overdrive) speed and B back to first speed. Thereafter to get fifth and sixth speeds, B is changed to second and third speeds.

On third speed all the main shafts, namely 30, 32, 110 and 111 are running at the same speed. During the change to fourth speed the shafts 32 and 110 have to be substantially accelerated relative to the final driven shaft 111, while the driving shaft 30 is retarded. If the various gear-selecting clutch control elements are operated simultaneously to preselect this change, as is convenient in practice, the change can be carried out by first retarding the engine to an extent not less than the change of ratio yielded by the unit A, so as to engage the high speed in A and thereafter accelerating the engine to an extent not less than the change of ratio between the third and first speeds of unit B to engage the first speed in B. This gear change is thus apt to take undue time. However the auxiliary mechanism shown in Fig. 9 enables this particular gear change, as well as the change from fourth to third speed, where a similar delay may arise, to be made as rapidly as any other.

A gear wheel 131, fixed to the shaft 110 meshes with a gear wheel 132 which is journalled on the countershaft 118 of unit B. A control member 134 can be moved to engage the wheel 132 alternatively with a friction clutch member 135' fixed to the shaft 118 and with a brake ring 136 fixed to the casing of unit B. The auxiliary gear wheel 131 is slightly smaller in diameter than the first gear wheel 113 of unit B (Fig. 8).

In changing from third to fourth speeds the control members of the two units A and B are moved to preselect fourth speed, the driving shaft 30 is decelerated, and immediately the driving torque has vanished the control lever 134 is rocked anti-clockwise about its pivot 134a, and clutches the auxiliary wheel 132 to the countershaft 118, until the shafts 32 and 110 have been accelerated enough to establish first gear in unit B; the retardation of the driving shaft need be only enough to establish overdrive gear in unit A.

In changing from fourth to third speed, after the preselector control members of the units A and B have been operated, the driving shaft 30 is momentarily decelerated and then accelerated. As soon as the driving torque has vanished the control lever 134 is rocked clockwise and clutches the auxiliary wheel 132 to the brake ring 136 until the shafts 32 and 110 have been retarded enough to establish third gear in unit B, the driving shaft accelerating until low (direct) gear is engaged in unit A.

If the shaft 110 of the unit shown in Fig. 8 is urged backwards while the synchro-coupling nut 124 on the countershaft is in an intermediate position, the pawls of the latter may act to prevent rotation of the gear. Therefore in reversing the system shown in Fig. 9, it is necessary to lock the nut 124 in one or other of its engaged positions before engaging reverse in unit A.

If in the arrangement shown in Fig. 9 the difference between the high- and low-speed ratios in unit A is less than that between the third- and first-speed ratios in unit B, the unit A may be employed to yield an over-drive ratio giving one speed higher than over-all direct drive. Thus four forward speeds are successively obtainable without a double change of gear-selecting clutches at any gear change, and in this case the auxiliary gear wheels 131 and 132 and the control means therefor are not necessary.

Fig. 10 shows an arrangement in which high speed is obtained by a direct mechanical drive, while low speed is given by a hydraulic torque-converter of the kinetic type. Consequently the speed ratio determined by the low-speed path is not fixed, being dependent on the absolute speed of the driving shaft and the torque load on the driven shaft. In such an arrangement it is necessary to render the torque-converter inoperative as such when direct drive is established; otherwise the hydraulic frictional losses would be prohibitive.

The impeller 141 of the hydraulic converter is fixed to the driving shaft 140, while the turbine 142 is fixed to the driven shaft 145. The hydraulic reaction member 146 is adapted to be connected to a non-rotatable member 151 by a unidirectional coupling 147, which may be provided with locking means 149 for braking under over-running conditions. The coupling shown is of the Legge type as hereinbefore described.

The driven shaft 145 is provided with teeth 145a co-operating with teeth 148a on a nut 148 engaged on right-handed helical splines 143 on the driving shaft 140. A controllable locking ring 150 is slidable on and splined to the nut 148 and is engageable with a toothed collar 144 formed on the shaft 140. It is actuated by rods 152 fixed to a control member 153.

The working circuit of the hydraulic converter is kept continuously filled when running. The means for replacing liquid that leaks at the glands and for circulating liquid to a cooler, being well known, are not shown.

In starting from rest, when the shaft 140 is accelerated in the direction of the arrow, the nut 148 remains in the disengaged position shown and the driven shaft 145 is driven solely by the energy transmitted by the hydraulic circuit which produces an increase of torque in known manner, the torque reaction on the member 146 being transmitted by the coupling 147 to the fixed part 151.

To engage direct drive the locking ring 150 is urged to the left and the shaft 140 is retarded until its speed tends to drop below that of the driven shaft 145. The nut 148 is now drawn to the left, engaging the teeth 145a and 148a so that the speeds of the two shafts are maintained in synchronism under overrunning torque. Completion of this helical displacement of the nut 148 on the driving shaft 140 brings the spaces between the splines on the locking ring 150 in register with the teeth on the collar 144 and the locking ring consequently moves to the left and locks the nut on the splines 143. The shaft 140 is now accelerated, the driving torque passing through this locked synchro-coupling.

The impeller and the turbine of the hydraulic converter thus rotate at the same speed, and they cause the hydraulic reaction member 146 to rotate freely with them, the unidirectional coupling 147 now being disengaged. In this way hydraulic frictional losses on direct drive are eliminated.

I claim:

1. Change-speed gearing having a driving shaft, a driven shaft, and at least two power-transmission paths of different ratios respectively, which alternately serve to connect said shafts together, wherein the lower-speed ratio path comprises a unidirectional coupling which is so set that its elements are at all times incapable of relative rotation in the sense permitting the ratio of the speeds of said driving and driven shafts to exceed said lower-speed ratio, and the higher-speed ratio path comprises a unidirectional coupling which is so set that its elements are at all times incapable of relative rotation in the sense permitting the ratio of the speeds of said driving and driven shafts to be lower than said higher-speed ratio, the said two couplings being capable of disengaging automatically on reversal of torque therethrough, and said higher-speed coupling being associated with locking means which, during the establishing of the drive through said higher-speed path, are incapable of being engaged to lock this coupling before the ratio of the speeds of said shafts has become equal to the higher-speed ratio and which are adapted to lock this coupling so as to render it capable of transmitting driving torque, and a control member operable for actuating said locking means.

2. Gearing as claimed in claim 1, wherein said locking means are also associated with said lower-speed coupling and are incapable of being engaged, during the establishing of the drive through said lower-speed path, to lock said lower-speed coupling before it is engaged, said locking means being adapted to lock said last-mentioned coupling so as to render it capable of transmitting over-running torque.

3. Gearing as claimed in claim 1 and comprising additional locking means which are associated with said lower-speed coupling, which are incapable of being engaged, during the establishing of the drive through said lower-speed path, to lock said lower-speed coupling before it is engaged, and are adapted to lock said last-mentioned coupling so as to render it capable of transmitting over-running torque, the said control member being operatively connected with the said two locking means for biasing them alternatively towards the locked condition.

4. Change-speed gearing having a driving shaft, a driven shaft, and at least two power-transmission paths of different ratios respectively, which alternatively serve to connect said shafts together, wherein the lower-speed ratio path comprises a unidirectional coupling which, when the ratio of the speeds of said driving and driven shafts tends to exceed said lower-speed ratio, invariably engages automatically under the influence of driving torque, and the higher-speed ratio path comprises a unidirectional coupling which, when the ratio of the speeds of said driving and driven shafts tends to be lower than said higher-speed ratio, invariably engages automatically under the influence of over-running torque, the said two couplings being capable of disengaging automatically on reversal of torque therethrough, and the said two couplings being associated with locking means which are operable for rendering them alternatively capable of transmitting torque bidirectionally, and which, during the establishing of the drive through the one or the other of said couplings, are incapable of being locked before the associated coupling has been engaged under the influence of driving or overrunning torque respectively, said gearing also comprising a preselector control member, and resilient means connecting said control member to said locking means.

5. Gearing as claimed in claim 1, wherein at least one of said alternative speed paths includes an additional variable-speed gearing.

6. Gearing as claimed in claim 1, wherein at least one of said alternative speed paths includes an additional variable-speed gearing which in itself has a driving shaft, a driven shaft, and at least two power-transmission paths of different ratios respectively, which alternatively serve to connect said shafts together, wherein the lower-speed ratio path comprises a unidirectional coupling which, when the ratio of the speeds of said driving and driven shafts tend to exceed said lower-speed ratio, invariably engages automatically under the influence of driving torque, and the higher-speed ratio path comprises a unidirectional coupling which, when the ratio of the speeds of said driving and driven shafts tends to be lower than said higher-speed ratio, invariably engages automatically under the influence of over-running torque, the said two couplings being capable of disengaging automatically on reversal of torque therethrough, and said higher-speed coupling being associated with locking means which, during the establishing of the drive through said higher-speed path, are incapable of being engaged to lock this coupling before it is engaged and which are adapted to lock this coupling so as to render it capable of transmitting driving torque, and a control member operable for actuating said locking means.

7. Gearing as claimed in claim 1, wherein one of said alternative speed paths includes an additional clutch device operable for yielding a neutral condition.

8. Change-speed gearing comprising a driving shaft, a driven shaft, a planetary gear train for yielding two alternative forward speed ratios and a reverse gear between said shafts, a unidirectional coupling associated with said shafts and train and arranged to establish the lower-speed forward ratio when the speed ratio of said driving and driven shafts tends to exceed the lower-speed forward ratio, a second unidirectional coupling associated with said shafts and train and so arranged as to be engaged by over-running torque when the speed ratio of said driving and driven shafts tends to be lower than the higher-speed forward ratio, locking means for rendering said last-mentioned coupling capable of transmitting driving torque, a control member for actuating said locking means, and reversing brake means for selecting alternative elements of said planetary gear train to be restrained against rotation.

9. A power transmission system comprising a gearing as claimed in claim 1 associated with a planetary gear unit having a reaction element, a main driving shaft and a main driven shaft, one of said main shafts of the planetary unit being coupled to one of said main shafts of said gearing, and said gearing having an element which is constrained to rotate slower than the said main shaft thereof that is remote from said planetary gear unit, and a disengageable coupling between said gearing element and said reaction member.

10. A power transmission system comprising two units of change-speed gearing, said units being connected in series so that the driving shaft of the first unit and the driven shaft of the second unit constitute respectively the main input and output shafts of the system, and each of said units having between its driving and driven shafts low- and high-speed transmission paths which are alternatively engageable by means respectively of a forward-drive unidirectional coupling and an inverted unidirectional coupling associated with a controllable locking member, control means associated with the connection between the driven shaft of the first unit and the driving shaft of the second unit, said control means being operable while the system is running and during a gear-changing operation involving interruption of the main transmission simultaneously in both of said units, for forcibly varying the speed of said connection.

11. A power transmission system comprising two units of change-speed gearing, said units being connected in series so that the driving shaft of the first unit and the driven shaft of the second unit constitute respectively the main input and output shafts of the system, and at least one of said units having a gear-selecting clutch of the type that is incapable of engagement before the speeds of the elements which it is required to couple have attained synchronism, control means including a slipable coupling device having one element coupled to the connection between the driven shaft of the first unit and the driving shaft of the second unit and the other element permanently connected to one of said main shafts of the system, said control means being operable, while the system is running and during a gear-changing operation involving interruption of the main transmission simultaneously in both of said units, for forcibly varying the speed of said connection.

12. A power transmission system comprising two units of change-speed gearing, each having a driving shaft, a driven shaft, and at least two power-transmission paths of different ratios respectively, which alternatively serve to connect said shafts together, wherein the lower-speed ratio path comprises a unidirectional coupling which, when the ratio of the speeds of said driving and driven shafts tends to exceed said lower-speed ratio, invariably engages automatically under the influence of driving torque, and the higher-speed ratio path comprises a unidirectional coupling which, when the ratio of the speeds of said driving and driven shafts tends to be lower than said higher-speed ratio, invariably engages automatically under the influence of overrunning torque, the said two couplings being capable of disengaging automatically on reversal of torque therethrough and said higher-speed coupling being associated with locking means which, during the establishing of the drive through said higher-speed path, are incapable of being engaged to lock this coupling before it is engaged, and which are adapted to lock this coupling so as to render it capable of transmitting driving torque, and a control member operable for actuating said locking means, said units being connected in series so that the driving shaft of the first unit and the driven shaft of the second unit constitute respectively the main input and output shafts of said system, an auxiliary power transmission path between one of said main shafts and the connection between the driven shaft of the first unit and the driving shaft of the second unit, said auxiliary path including a controllable slipable coupling operable for accelerating said connection during a gear-changing operation involving interruption of the main transmission simultaneously in both of said units.

13. Change-speed gearing, comprising a driving shaft, a driven shaft, a higher-speed transmission path between said shafts, a lower-speed transmission path between said shafts, each of said paths including a common gear-changing clutch device comprising three torque-transmitting elements capable of rotation relative to one another and of which the first and second when locked together yield a drive through said higher-speed path and the second and third when locked together yield a drive through said lower-speed path, the first and third of said elements having teeth, said clutch device also comprising an intermediate toothed member constrained to move helically on the second of said elements between end positions in which it is engaged respectively with the teeth of said first and third elements, two auxiliary ratchet coupling devices arranged respectively to couple said intermediate member to said first and third elements, and having pawls so positioned as to be operative only when said intermediate member is intermediate its end positions, and control means for locking said intermediate member in its end positions.

14. Change-speed gearing, comprising a driving shaft, a driven shaft, a higher-speed transmission path between said shafts, a lower-speed transmission path between said shafts, each of said paths including a common gear-changing clutch device comprising three torque-transmitting elements capable of rotation relative to one another and of which the first and second when locked together yield a drive through said higher-speed path and the second and third when locked together yield a drive through said lower-speed path, the first and third of said elements having teeth, said clutch device also comprising an intermediate toothed member constrained to move helically on the second of said elements between end positions in which it is engaged respectively with the teeth of said first and third elements, pawls on said first and third elements so positioned as to engage teeth on said intermediate member only when said intermediate member is out of its end positions, said pawls serving to control the meshing of said intermediate member with said first and third elements, and control means operable for locking said intermediate member in at least one of its end positions.

15. Change-speed gearing, comprising a driving shaft, a driven shaft, a higher-speed transmission path between said shafts, a lower-speed transmission path between said shafts, each of said paths including a common gear-changing clutch device comprising three torque-transmitting elements capable of rotation relative to one another and of which the first and second when locked together yield a drive through said higher-speed path and the second and third when locked together yield a drive through said lower-speed path, the first and third of said elements having teeth, said clutch device also comprising an intermediate toothed member constrained to move helically on the second of said elements between end positions in which it is engaged respectively with the teeth of said first and third elements, pawls on said intermediate member so positioned as to engage teeth on said first and third elements only when said intermediate member is out of its end positions, said pawls serving to control the meshing of said intermediate member with said first and third elements, and control means operable for locking said intermediate member in at least one of its end positions.

16. Change-speed gearing having a driving shaft, a driven shaft, a high-speed transmission path and a low-speed transmission path arranged in parallel between said shafts, a unidirectional coupling included in said low-speed path and arranged to engage when subjected to driving torque, a unidirectional coupling which is included in said high-speed path and which is incapable of disengagement under over-running torque, locking means for said last-mentioned coupling, which are balked out for engagement, during deceleration of said driving shaft relative to said driven shaft from the low- to the high-speed ratio, and which are engageable after said high-speed coupling has engaged, and a control member operable to disengage said locking means.

17. Change-speed gearing comprising a driving shaft, a driven shaft, a higher-speed drive path and a lower-speed drive path between said shafts, and means for establishing the drives through said paths, wherein the means for establishing the higher-speed drive consist of a unidirectional coupling device which is incapable of being rendered bi-directionally free and which is so set that, upon reduction of speed of said driving shaft relative to that of said driven shaft during a change to the higher-speed drive, the unidirectional coupling engages when the speed ratio of said shafts equals the higher-speed drive ratio and so maintains said shafts synchronised in said ratio under over-running torque, said unidirectional coupling device including controllable locking means which, during the establishing of said higher-speed drive, are incapable of being engaged before the unidirectional coupling is engaged, and which, when engaged, render the device capable of transmitting torque.

18. Change-speed gearing comprising a driving shaft, a driven shaft, a higher-speed drive path and a lower-speed drive path between said shafts, and means for selectively establishing the drives through said paths, wherein the means for establishing the higher-speed drive consist of a jaw clutch having two interengageable toothed members one of which is arranged to move helically with respect to a transmission element to which it is drivably connected, a subsidiary ratchet drive in parallel with said toothed members for maintaining them in register for interengagement upon reduction of the speed ratio of said driving shaft relative to said driven shaft to the ratio of the higher-speed drive, means operable for locking said toothed members in engagement together, and control means operable at will for disengaging said locking means.

19. Change-speed gearing comprising a driving shaft, a driven shaft, a higher-speed drive path and a lower-speed drive path between said shafts, and means for establishing the drives through said paths, wherein the means for establishing the higher-speed drive consist of a unidirectional coupling device which is incapable of being rendered bi-directionally free and which is so set that, upon reduction of speed of said driving shaft relative to that of said driven shaft during a change to the higher-speed drive, the unidirectional coupling engages when the speed ratio of said shafts equals the higher-speed drive ratio and so maintains said shafts synchronised in said ratio under overrunning torque, said unidirectional coupling device including controllable locking means which, during the establishing of said higher-speed drive, are incapable of being engaged before the unidirectional coupling is engaged, and which, when engaged, render the device capable of transmitting driving torque, resilient means for biasing said locking means towards their inoperative position, and a preselector control member operable for straining said resilient means.

20. Change-speed gearing having a driving shaft, a driven shaft, a low-speed transmission path between said shafts, means operable for engaging and disengaging the drive through said path, a high-speed transmission path between said shafts including a unidirectional coupling the driving element of which is at all times incapable of rotating relatively to the driven element in such a sense as to permit the speed ratio of said driving shaft relative to said driven shaft to fall below the high-speed ratio, locking means which are included in said unidirectional coupling, which are incapable of being engaged while said coupling elements are rotating relatively to each other, and which when engaged, establish a high-speed driving condition, and a preselector control member operable for biasing said locking means towards their disengaged condition.

HAROLD SINCLAIR.